United States Patent
Yasuno et al.

(10) Patent No.: US 6,872,348 B2
(45) Date of Patent: Mar. 29, 2005

(54) MANUFACTURING METHOD OF AIR PASSAGE SWITCHING DOOR

(75) Inventors: Masao Yasuno, Kariya (JP); Chiharu Kamiya, Kariya (JP); Kousei Banno, Kariya (JP); Hiroyuki Saito, Kariya (JP)

(73) Assignees: Denso Corporation, Kariya (JP); Shimizu Industry Co., Ltd., Kariya (JP)

( * ) Notice: Subject to any disclaimer, the term of this patent is extended or adjusted under 35 U.S.C. 154(b) by 0 days.

(21) Appl. No.: 10/643,715

(22) Filed: Aug. 19, 2003

(65) Prior Publication Data
US 2004/0038639 A1 Feb. 26, 2004

(30) Foreign Application Priority Data
Aug. 20, 2002 (JP) .................................. 2002-239246

(51) Int. Cl.[7] .............................................. B29C 45/14
(52) U.S. Cl. ....................... 264/274; 264/259; 264/275; 264/279.1; 264/328.8; 264/328.12
(58) Field of Search ................................. 264/274, 259, 264/275, 279.1, 328.8, 328.12

(56) References Cited
U.S. PATENT DOCUMENTS

| | | | | |
|---|---|---|---|---|
| 4,764,409 A | * | 8/1988 | Freeman | 428/98 |
| 5,618,485 A | * | 4/1997 | Gajewski | 264/255 |
| 6,047,951 A | * | 4/2000 | Ito et al. | 251/308 |
| 6,159,409 A | * | 12/2000 | Benda | 264/255 |
| 6,412,755 B2 | * | 7/2002 | Ito | 251/173 |
| 6,523,805 B2 | * | 2/2003 | Kato et al. | 251/306 |
| 6,579,485 B2 | * | 6/2003 | Smith et al. | 264/247 |
| 6,641,768 B2 | * | 11/2003 | Ito et al. | 264/242 |
| 6,676,397 B2 | * | 1/2004 | Kato et al. | 425/112 |

* cited by examiner

Primary Examiner—Michael P. Colaianni
Assistant Examiner—Monica A. Fontaine
(74) Attorney, Agent, or Firm—Harness, Dickey & Pierce, PLC

(57) ABSTRACT

An air passage switching system includes a switching door that is disposed rotatably in a case to open and close an air passage of the case. The switching door includes a door body, a rotation shaft provided in the door body, and a seal member made of an elastomer and adhering to an outer peripheral portion of the door body. The seal member contacts on a sealing surface of the case when the switching door closes the air passage. A plurality of recess portions are formed on the outer peripheral portion of the door body to be arranged in an outer peripheral direction. Thus, adhesion between the door body and the seal member can be strengthened.

8 Claims, 4 Drawing Sheets

MANUFACTURING METHOD OF AIR PASSAGE SWITCHING DOOR

CROSS REFERENCE TO RELATED APPLICATIONS

This application is based on and incorporates herein by reference Japanese Patent Application No. 2002-239246 filed on Aug. 20, 2002.

FIELD OF THE INVENTION

The present invention relates to an air passage switching system having a switching door for opening and closing an air passage through which air flows, and a manufacturing method of the switching door. More particularly, the present invention relates to a structure of adhesion between a door body and a seal member that is press-fitted onto a sealing surface of a case having the air passage.

BACKGROUND OF THE INVENTION

In a conventional air passage switching door for an air conditioner described in U.S. Pat. No. 6,047,951 (corresponding to JP-A-11-180129), a seal member that is made of an elastomer, a rubber or the like, is provided on an outer peripheral portion of a door body, and is press-fitted to a sealing surface of a case having an air passage in order to switch the air passage. In the air passage switching door, the door body is made of resin to have a high rigidity (i.e., inelastic property). Further, a rotation shaft is formed integrally with the door body at a center in a lateral direction. Generally, the seal member made of a rubber material is inserted into a mold at a preset position in the mold, and thereafter a resin material is injected into the mold, so that the outer peripheral portion of the door body is connected to the seal member.

However, when the seal member press-contacts the seal surface for closing the air passage, peeling force (i.e., separation force) works to the outer peripheral portion of the door body. Adhesion strength is required between the seal member and the door body at the outer peripheral portion, so that the outer peripheral portion of the door body is not separated from the seal member due to the peering force working on the outer peripheral portion in a shearing direction (see "A" direction in FIG. 3). Thus, when the adhesion strength is low, the seal member is separated from the door body.

SUMMARY OF THE INVENTION

In view of foregoing problems, it is an object of the present invention to provide an air passage switching system having a switching door in which adhesion is strengthened between an outer peripheral portion of a door body and a seal member. It is another object of the present invention to provide a manufacturing method of the air passage switching door.

According to a first aspect of the present invention, an air passage switching system includes a case forming an air passage, and a switching door disposed rotatably in the case to switch an air flow of the air passage. The switching door includes a door body, a rotation shaft on the door body, and a seal member made of an elastomer. The seal member adheres to an outer peripheral portion of the door body, and the seal member press-contacts a sealing surface of the case when the door closes the air passage. In the air passage switching door, at least one of a recess portion and a protrusion portion is provided in the door body on the outer peripheral portion. Accordingly, adhesion area between the door body and the seal member is widened. Thus, adhesion between the door body and the seal member is strengthened comparing with a conventional structure which doesn't have the recessed portion or the protrusions. As a result, the door body and the seal member can have stable adhesion strength by injection molding. In the present invention, plural recess portions or plural protrusion portions can be provided on the outer peripheral portion of the door body. In this case, the adhesion strength between the door body and the seal member can be further increased.

According to a second aspect of the present invention, in a manufacturing method of an air passage switching door, after a door body having a plurality of recess portions recessed from an outer peripheral portion is formed, the door body is inserted in a mold, at a predetermined position, such that the recess portions are positioned to approximately correspond to outlets of runners for supplying an injection material in the mold. Further the outlets of the runners are throttled to increase a flow speed of the injection material and to increase a temperature of the injection material around the recess portions. Accordingly, the adhesion strength between the door body and a seal member made of the injection material can be effectively improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

A first embodiment of an air passage switching system according to the present invention will be described with referent to FIG. 1 to FIG. 3. In the first embodiment, an air passage switching system having a switching door is typically used for an air conditioner for a vehicle. For example, the switching door is used as a mode door that switches an air flow toward a face opening, a defroster opening and a foot opening, or is used as an air mixture door that adjusts an air outlet temperature by controlling ratio of cool air to warm air.

Figure 1:
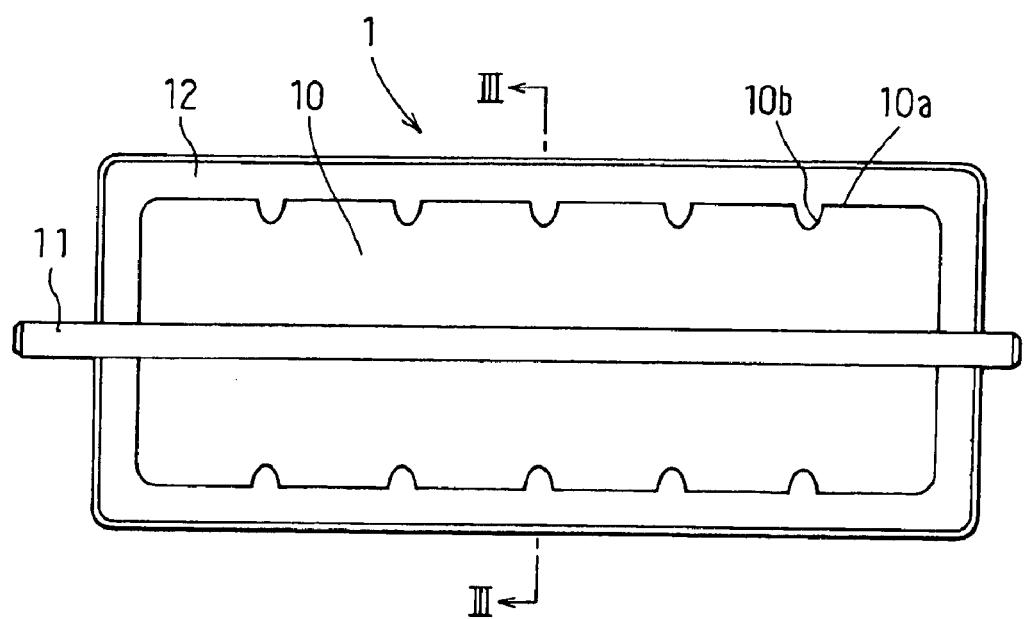
FIG. 1 is a front view illustrating a butterfly door according to a first preferred embodiment of the present invention.
Figure 2A:
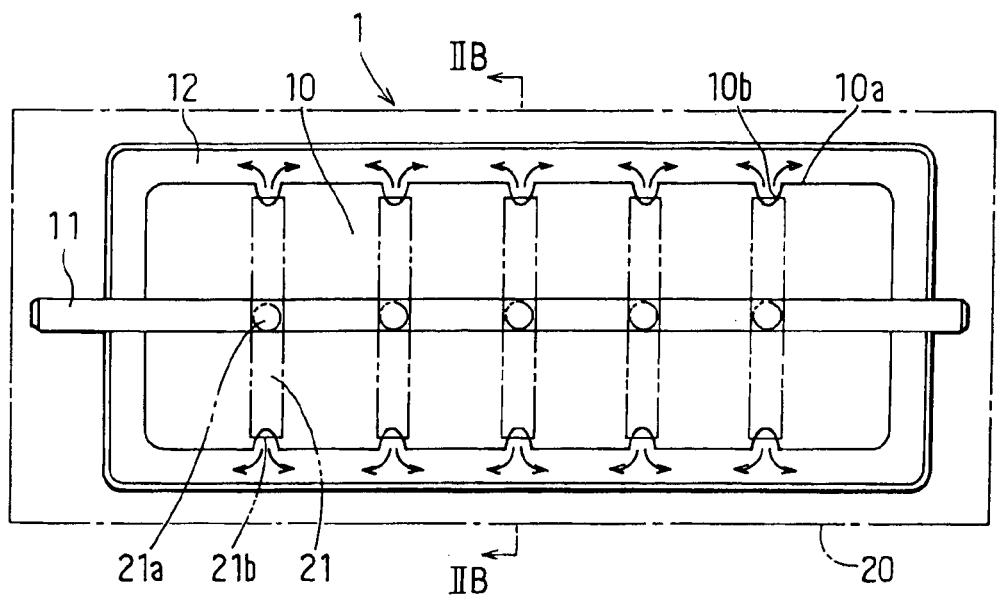
FIG. 2A is a schematic diagram for explaining an injection of a rubber material in a molding of a seal member of the butterfly door.

As shown in FIG. 1, the air switching system includes a butterfly door 1 as the switching door having a door body 10 which is rectangular shaped. In the switching door, the door body 10 is made of a resin material to construct a high rigid portion, in other words, an inelastic part. A rotation shaft 11 is formed integrally with the door body 10 at a center in the lateral direction of the door body 10. A seal member 12 is made of an elastic material such as a rubber, and adheres on an outer peripheral portion 10a of the door body 10 in a frame shape or circularly. Plural notches 10b (recess portions) are formed on the outer peripheral portion 10a and are arranged in an outer peripheral direction, to strengthen adhesion by widening adhesion area. A width of each notch 10b is set to enhance adhesion strength between the outer peripheral portion 10a of the door body 10 and the seal member 12. Herein, the method of forming and adhering of the seal member 12 onto the door body 10 is explained with reference to FIGS. 2A and 2B.

Figure 2B:
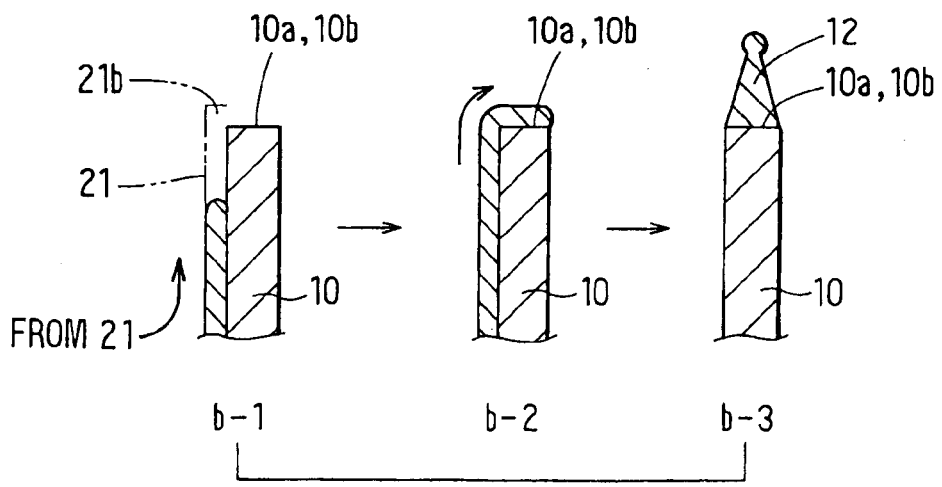
FIG. 2B is a schematic diagram showing a flow of the rubber material in the molding, according to the first embodiment.

Specifically, the door body 10 having the notches 10b is inserted at a preset position into a mold 20. Thereafter, an elastic rubber material is injected into the mold 20, so that the seal member 12 can be formed integrally with the door body 10 around the outer peripheral portion 10a of the door body 10. In this mold 20, a plurality of runners 21 are arranged. The runners 21 form passages of a rubber material injected from each gate 21a. Outlets 21b, from which a rubber material flows out, are provided in the runners 21. The outlets 21b are throttled in the runners 21 to increase a flow of the rubber material ejected to the notches 10b. Thus, as shown in FIG. 2B, the rubber material injected from the gate 21a is led to the notches 10b as shown b-1 and b-2 in FIG. 2B, and is ejected from the outlets 21b of the runners 21. Accordingly, as shown by b-3 in FIG. 2B, the seal member 12 is formed around the outer peripheral portion 10a like a frame.

As described above, the temperature of the injection material is raised by searing heat because the flow speed of the rubber material is increased around the notches 10b. Thus, adhesion strength is enhanced at the notches 10b particularly, in the outer peripheral portion 10a after the molding. In the first embodiment, the width of the notches 10b is set to be equal or less than the width of outlets 21b of runners 21. In the first embodiment, because the rubber material effectively flows in the molding, it can prevent the seal member 12 from deformed, and from causing of a flash.

Figure 3:
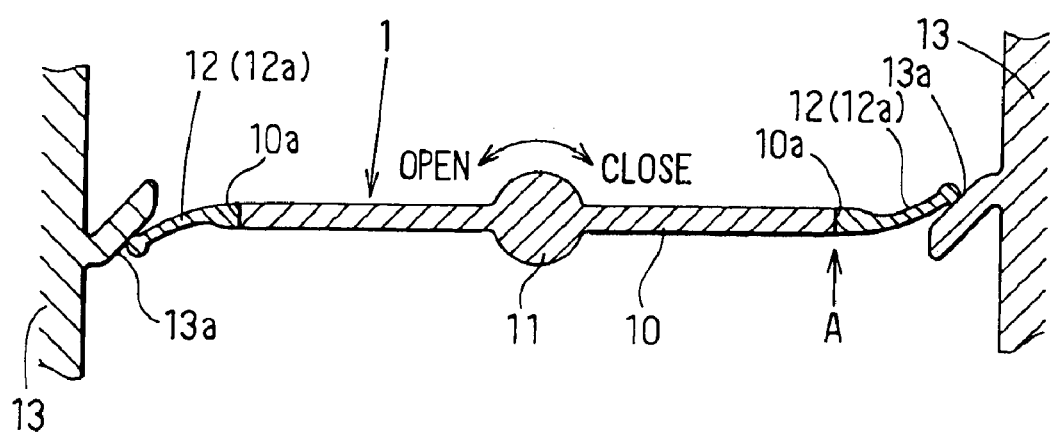
FIG. 3 is a cross-sectional view illustrating the butterfly door taken along the line III—III in FIG. 1.

On the other hand, referring to FIG. 3, a sealing surface 13a, having an inclined surface, is formed to protrude from an inner wall of a case 13, which forms an air passage. An outer peripheral portion 12a of the seal member 12 of the butterfly door 1 press-contacts the sealing surface 13a, so that the outer peripheral portion 12a of the door body 10 can seal against the case 13. Thus, the air passage can be closed. As a material for forming the door body 10 of the butterfly door 1, a resin material such as polypropylene, nylon and ABS is suitably used. A filler, glass fiber or the like, may be added into the resin material in order to reinforce the door body 10. As a material for forming the seal member 12, an elastic material such as rubber, silicone rubber and thermo plastic elastomer (TPE) is suitably used. Especially, TPE enables stabilizing of adhesion strength between door body 10 and the seal member 12. The case 13 for forming the air passage may be made of the same resin material as that of the door body 10.

Operation of the butterfly door 1, which has above-mentioned structure, is described as followed. The butterfly door 1, when closing the air passage, is shown in FIG. 3. When the rotation shaft 11 is rotated by a predetermined angle in a counterclockwise direction from the position in FIG. 3, the air passage is opened. Thereafter, when the rotation shaft 11 is rotated in a clockwise direction by the predetermined angle, the air passage is closed.

When the butterfly door 1 closes the air passage, that is, when the butterfly door 1 is press-fitted onto the sealing surface 13a of the case 13, separation force works on the outer peripheral portion 10a in a shearing direction ("A" direction in FIG. 3). In this embodiment, because the plural notches 10b are provided, adhesion area between the seal member 12 and the door body 10 can be increased. Thus, adhesion strength between the seal member 12 and the door body 10 is enhanced comparing with a case without the notches 10b.

According to the manufacturing method of the first embodiment, because the flow speed of the injected rubber material around the notches 10b is increased, temperature of the injected rubber material is increased by the shearing heat. The raise of temperature enables strengthening of adhesion around the notches 10b, that is, between the outer peripheral portion 10a and the seal member 12.

Further, the rubber material flow speed is increased by setting the width of the notches 10b to be equal or less than the width of the outlets 21b of the runners 21. Thus, stable adhesion strength between the outer peripheral portion 10a and the seal member 12 can be maintained by the injection molding. Furthermore, the seal member 12 can air-tightly seal the sealing surface 13a of the air passage, by forming the seal member 12 to surround the outer peripheral portion 10a of the door body 10. Thus, when the butterfly door 1 is closed, the air passage is blockaded tightly.

Figure 4:
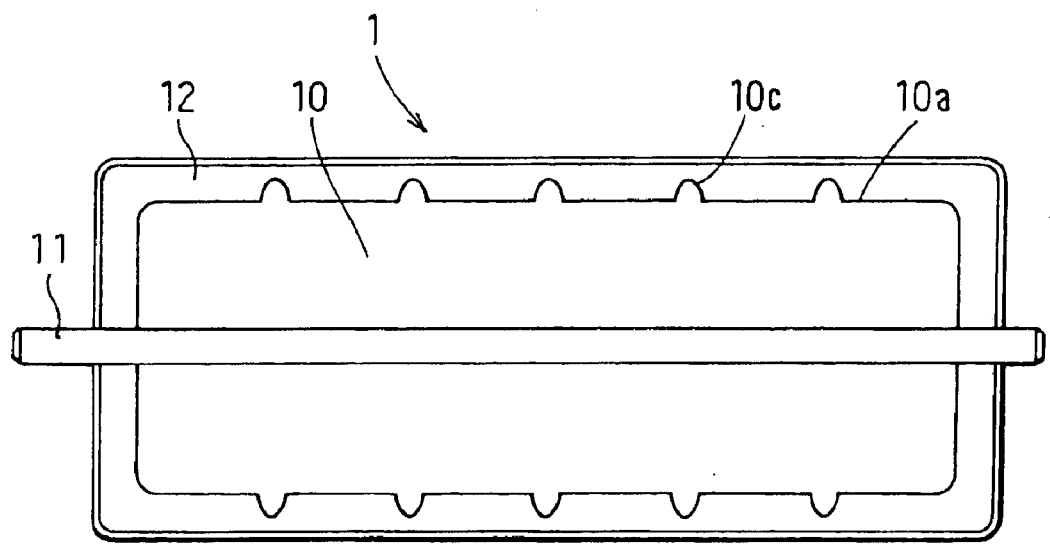
FIG. 4 is a front view illustrating a butterfly door according to a second preferred embodiment of the present invention.

A second embodiment of a switching door of an air passage switching system according to the present invention will be described with referent to FIG. 4.

In the above-described first embodiment, the plural notches 10b are formed at the outer peripheral portion 10a of the door body 10 whereto the seal member 12 adhere, was explained. However, in the second embodiment, plural protrusions 10c are provided on the outer peripheral portion 10a to be integrated with the seal member 12, so that adhesion area between the door body 10 and the seal member 12 is increased. Concretely, as shown in FIG. 4, the plural protrusions 10c are formed at the outer peripheral portion 10a to be arranged in the outer peripheral direction. Thus, similarly to the first embodiment, the adhesion area between the door body 10 and the seal member 12 is widened, thereby increasing the adhesion strength therebetween. The seal member 12 can adhere to the door body 10 by following method or the like. That is, the seal member 12 made of a rubber material is inserted into a mold at a preset position in the mold, and thereafter, a resin material for forming the door body 10 is injected into the mold. Even in this case, the door body 10 and the seal member 12 can be tightly bonded.

Figure 5:
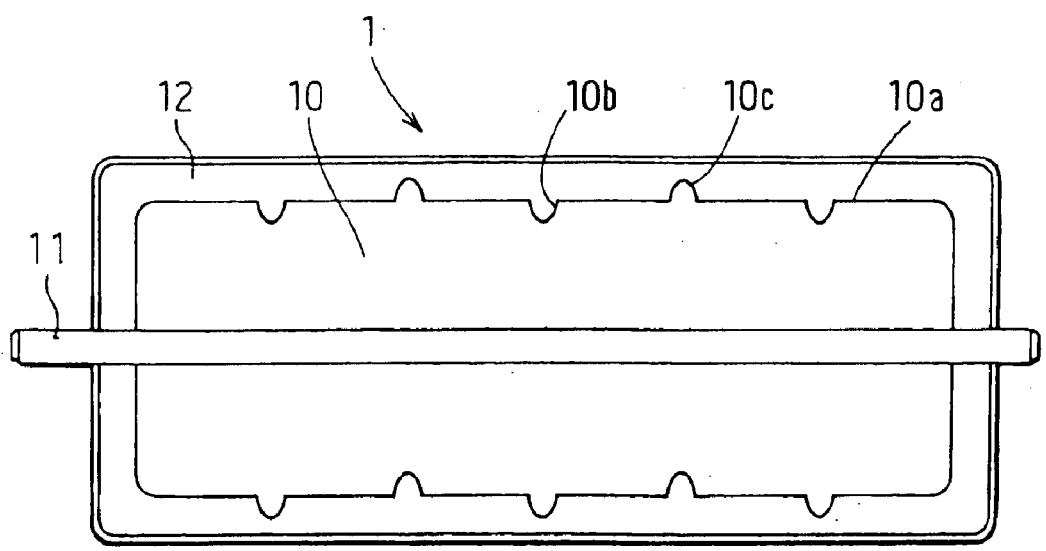
FIG. 5 is a front view illustrating a butterfly door according to a third preferred embodiment of the present invention.

A third embodiment of a switching door of an air passage switching system according to the present invention will be described with referent to FIG. 5. In the above-described first embodiment, the plural notches 10b or the plural protrusions 10c are formed on the outer peripheral portion 10a of the door body 10. However, in the third embodiment, as shown in FIG. 5, the plural notches 10b and the plural protrusions 10c are alternately arranged on the outer peripheral portion 10a in the outer peripheral direction. Even in this case, the door body 10 and the seal member 12 can be tightly bonded. Thus, similarly to the first embodiment and second embodiment, the adhesion area between the door body 10 and the seal member 12 is widened, thereby increasing the adhesion strength therebetween.

Although the present invention has been fully described in connection with the preferred embodiments thereof with reference to the accompanying drawings, it is to be noted that various changes and modifications will become apparent to those skilled in the art.

Figure 6:
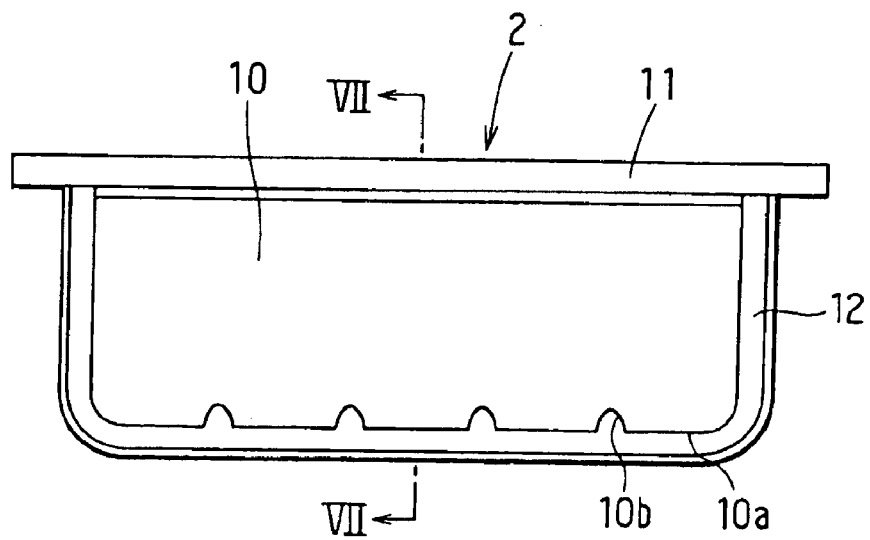
FIG. 6 is a front view illustrating a switching door according to a modification of the present invention.
Figure 7:
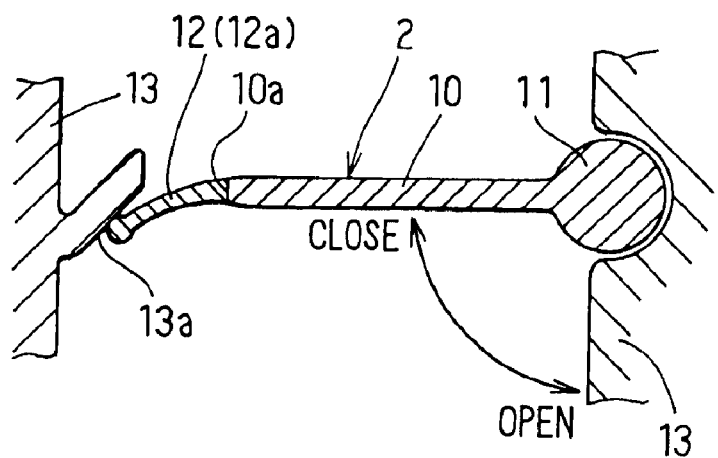
FIG. 7 is a cross-sectional view taken along the line VII—VII in FIG. 6.

For example, in the above-described first through third embodiments, the present invention is applied to the butterfly door 1. However, the present invention can be applied to a switching door 2 having a rotation shaft 11 that is positioned on one longitudinal side end of the door body 10 as shown in FIG. 6. In this case, the switching door 2, as shown in FIG. 7, is supported rotatably in the case 13, to seal the sealing surface 13a formed in the case 13. The seal member 12, which has approximately a U-shape (C-shape) in cross-section is adhered integrally onto the outer peripheral portion 10a of the door body 10, whereon the rotation shaft 11 is not positioned. Even in this case, the switching door 2 has the plural notches 10b. On the outer peripheral portion 10a shown in FIG. 6, the adhesion strength between the door body 10 and the seal member 12 can be increased, similarly to the above-described first embodiments.

In the above-described embodiments, the plural notches 10b and the plural protrusions 10c are formed in the longitudinal side end of the door body 10. However, the notches 10b and the protrusions 10c can be provided at the lateral side end.

In the above-described embodiments, the plural notches 10b and the plural protrusions 10c are formed on the door body 10. However, a single notch 10b or a single protrusion 10c can be provided on the outer peripheral portion 10b. Even in this case, the advantage described in the above-described embodiments can be obtained.

In the above-described embodiments, the air passage switching door 1, 2 of the present invention is used for the mode door and the air mixture door. In addition to that, the door 1, 2 of the present invention can be used for an inside/outside air switching door or the like. Furthermore, the present invention can be used for an air passage switching door for other purpose than the air conditioning system for a vehicle. In short, the present invention can be used for air passage switching doors having a structure in which a seal member 12, adheres to an outer peripheral portion 10a of a door body 10 in a lip-shape.

In the switching door 2 shown in FIG. 6, the plural protrusions 10c can be provided on the outer peripheral portion 10a, similarly to the above-described second embodiment. Further similarly to the above-described third embodiment, the notches 10b and the protrusions 10c can be arranged on the outer peripheral portion 10a alternatively in the peripheral direction.

Such changes and modifications are to be understood as being within the scope of the present invention as defined by the appended claims.

What is claimed is:

1. A manufacturing method of an air passage switching door comprising:

forming a door body having a plurality of recess portions recessed from an outer peripheral portion of the door body; and inserting the formed door body in a mold at a predetermined position, such that the recess portions in the mold to be overlapped with outlets of runners for supplying an injection material into the mold, wherein:

the outlets of the runners are throttled to increase a flow speed of the injection material and to increase a temperature of the injection material around the recess portions.

2. A manufacturing method according to claim 1, wherein the recess portions are formed so that each width of the recess portions in an outer peripheral direction of the outer peripheral portion is equal to or less than each width of the outlets of the runners.

3. A manufacturing method according to claim 1, further comprising:

injecting the injection material from the outlets of the runner while the outlets are overlapped with the recess portions, respectively, so that a seal member is formed to surround the outer peripheral portion of the door body.

4. A manufacturing method according to claim 3, wherein, in the injecting, the seal member adheres to the outer peripheral portion of the door body.

5. A manufacturing method according to claim 3, wherein the seal member is a thermo-plastic elastomer.

6. A manufacturing method of an air passage switching door comprising:

forming a door body;

forming a plurality of recess portions recessed from an outer peripheral portion of the door body; and inserting the door body with the recess portions in a mold at a predetermined position, such that the recess portions are positioned in the mold to be overlapped with outlets of runners for supplying an injection material into the mold, wherein:

the outlets of the runners are throttled to increase a flow speed of the injection material and to increase a temperature of the injection material around the recess portions.

7. A manufacturing method according to claim 6, further comprising:

injecting the injection material from the outlets of the runner while the outlets are overlapped with the recess portions, respectively, so that a seal member is formed to surround the outer peripheral portion of the door body.

8. A manufacturing method according to claim 3, wherein an outer peripheral edge of the seal member forms a stepless surface.

* * * * *